(12) United States Patent
Marques et al.

(10) Patent No.: US 11,312,274 B2
(45) Date of Patent: Apr. 26, 2022

(54) VEHICLE SEATING SYSTEM AND METHOD

(71) Applicant: LEAR CORPORATION, Southfield, MI (US)

(72) Inventors: Jose Marques, Vaux-sur-Seine (FR); Nathalie Navarro, Viroflay (FR)

(73) Assignee: Lear Corporation, Southfield, MI (US)

(*) Notice: Subject to any disclaimer, the term of this patent is extended or adjusted under 35 U.S.C. 154(b) by 72 days.

(21) Appl. No.: 16/686,396

(22) Filed: Nov. 18, 2019

(65) Prior Publication Data

US 2021/0146813 A1 May 20, 2021

(51) Int. Cl.
*B60N 2/64* (2006.01)
*B60N 2/68* (2006.01)
*B60N 2/58* (2006.01)

(52) U.S. Cl.
CPC .......... *B60N 2/646* (2013.01); *B60N 2/5833* (2013.01); *B60N 2/5883* (2013.01); *B60N 2/68* (2013.01)

(58) Field of Classification Search
CPC ..... B60N 2/5833; B60N 2/646; B60N 2/5883
See application file for complete search history.

(56) References Cited

U.S. PATENT DOCUMENTS

| | | | |
|---|---|---|---|
| 5,236,243 A * | 8/1993 | Reyes | ........................ 297/219.1 |
| 5,501,165 A | 3/1996 | Nagashima | |
| 7,077,473 B2 | 7/2006 | Demain et al. | |
| 8,857,018 B2 | 10/2014 | Murasaki et al. | |
| 9,380,840 B2 * | 7/2016 | Okawa | |

* cited by examiner

*Primary Examiner* — Anthony D Barfield
(74) *Attorney, Agent, or Firm* — Brooks Kushman P.C.

(57) ABSTRACT

A seating system for a vehicle and a method for producing a seating system include a seat part having a cushion and a support material disposed on a surface of the cushion. An elongated member is attached to one side of the support material to create a channel in the opposite side, and a trim material is positioned over the support material to create a concavity in the trim material along the channel.

19 Claims, 4 Drawing Sheets

VEHICLE SEATING SYSTEM AND METHOD

TECHNICAL FIELD

The present disclosure relates to a seating system for a vehicle and a method for producing such a seating system.

BACKGROUND

Vehicle seating systems often include a number of components, such as a frame, foam cushions, and trim-cover material attached to the foam cushions. Because the trim-cover material is on the outside surface of the seat, and therefore visible to the vehicle occupants, a number of decorative features have been used with trim covers to enhance the overall appearance of the seat. For example, a trim cover may be pulled into a groove in the seat-cushion foam to provide a groove visible on the outside of the trim cover. This may require the trim cover to be made from two pieces sewn together at a seam. The ends of the two pieces of trim may then be pulled into the groove and attached, for example, with a hog ring or other clip positioned in the seat-cushion foam. These systems and methods may be time-consuming and costly, and thus not desirable for many vehicle lines. Although it may be desirable to use one large piece of trim cover material so that no sewing line is visible, this may lead to undesirable bagginess in the middle of the material because the single piece of trim cannot be pulled into the groove like the ends of the two sewn pieces. It would therefore be desirable to have a system and method for a vehicle seating system that provided aesthetically pleasing patterns without the disadvantages of known systems and methods.

SUMMARY

Embodiments described herein may include a seating system for a vehicle that includes a seat part having a cushion. A support material has a first side and a second side, with the second side of the support material being disposed on a surface of the cushion. An elongated member is attached to the second side of the support material along a path creating a channel in the first side of the support material along the path. A trim material has a first side facing outward away from the seat part and a second side facing inward toward the seat part. The second side of the trim material is attached to the first side of the support material such that a portion of the trim material is disposed in the channel.

Embodiments described herein may include a seating system for a vehicle that has a seat part including a cushion. A support material has a first side and a second side, with the second side of the support material being disposed on a surface of the cushion. An elongated member is attached to the second side of the support material along a path such that a first channel corresponding to the path is created in the first side of the support material. A trim material has a first side facing outward away from the seat part and a second side facing inward toward the seat part, and the second side of the trim material is attached to the first side of the support material along the first channel.

Embodiments described herein may include a method for producing a seating system for a vehicle having a seat part with a cushion. The method may include providing a support material having a first side and a second side, and attaching an elongated member to the second side of the support material along a path such that a first channel corresponding to the path is created in the first side of the support material. One side of a trim material is attached to the first side of the support material such that a portion of the trim material is positioned in the first channel.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
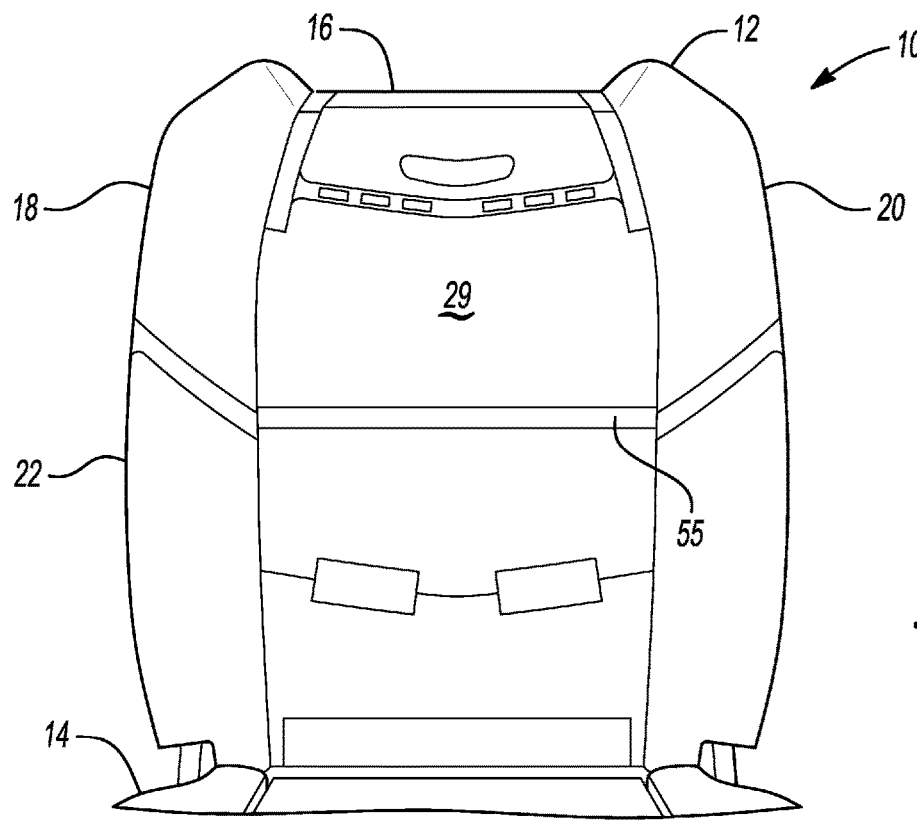
FIG. 1 shows a seat part forming part of a seating system in accordance with embodiments described herein.

FIG. 1 shows a seating system 10 in accordance with embodiments described herein. The seating system 10 includes a seat back 12 and a seat bottom 14, only a portion of which is illustrated in FIG. 1. The seat back 12 includes a center portion 16 and two side bolsters 18, 20. In general, the seat back 12, the seat bottom 14, and the bolsters 18, 20—and bolsters for the seat bottom 14 not separately called-out in FIG. 1—may be referred to as a "seat part" for convenience. Other portions of a seating system, such as the seating system 10, may also be considered a seat part, for example, a head restraint. In FIG. 1, the seat back 12 is shown without a trim cover material so that a cushion 22 is shown. The cushion 22 may be, for example, a polyurethane foam or other material.

Figure 2:
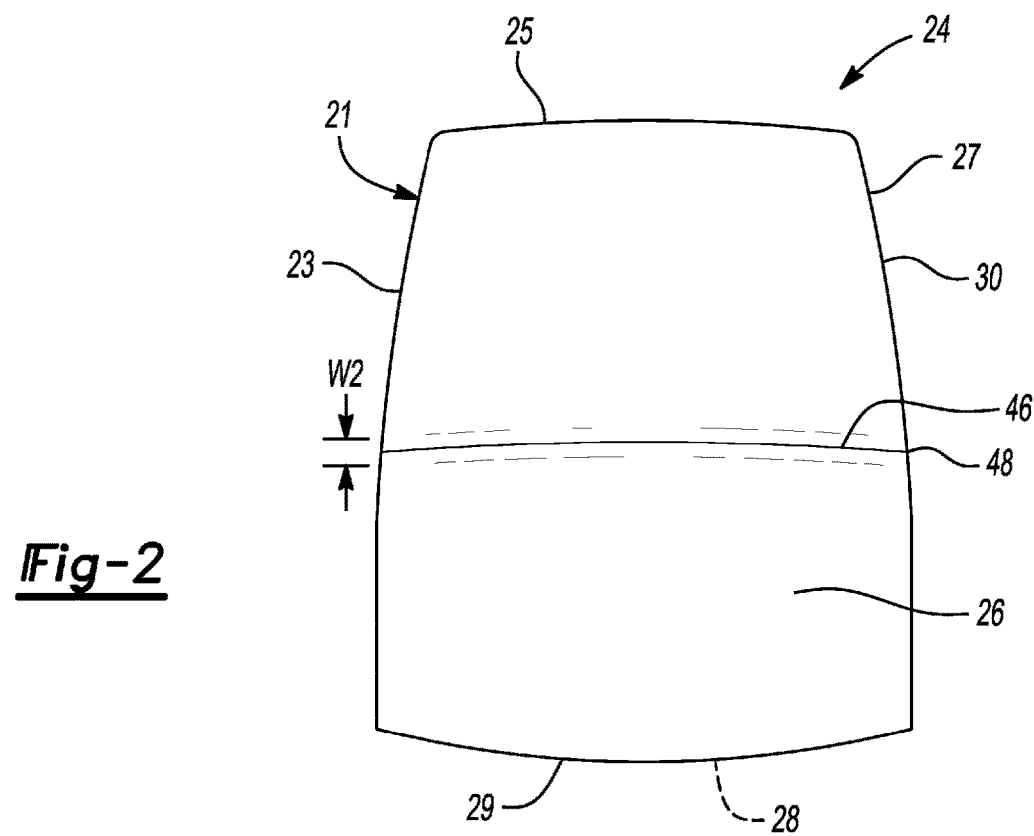
FIG. 2 shows a support material for a seating system in accordance with embodiments described herein.

FIG. 2 shows a support material 24, and in particular, shows a first side or A-side 26 of the support material 24. The support material 24 also includes a second side or B-side 28 shown upward in FIG. 3. Although the B-side 28 is shown upward in FIG. 3, this is for convenience only. In practice, the B-side 28 of the support material 24 will be attached to a surface 29 of the cushion 22—see also FIG. 1. The support material 24 defines a perimeter 21 having a plurality of edges 23, 25, 27, 29. In the embodiment shown in FIGS. 2 and 3, the support material 24 is a layered structure, having a layer of foam 30, which includes the A-side 26, and a layer of non-foam 32, which in this embodiment is a non-woven fleece material and includes the B-side 28. The support material 24 may also include an adhesive layer disposed on the surface of the foam layer 30, which may be used to attach a trim-cover material as explained below.

Figure 3:
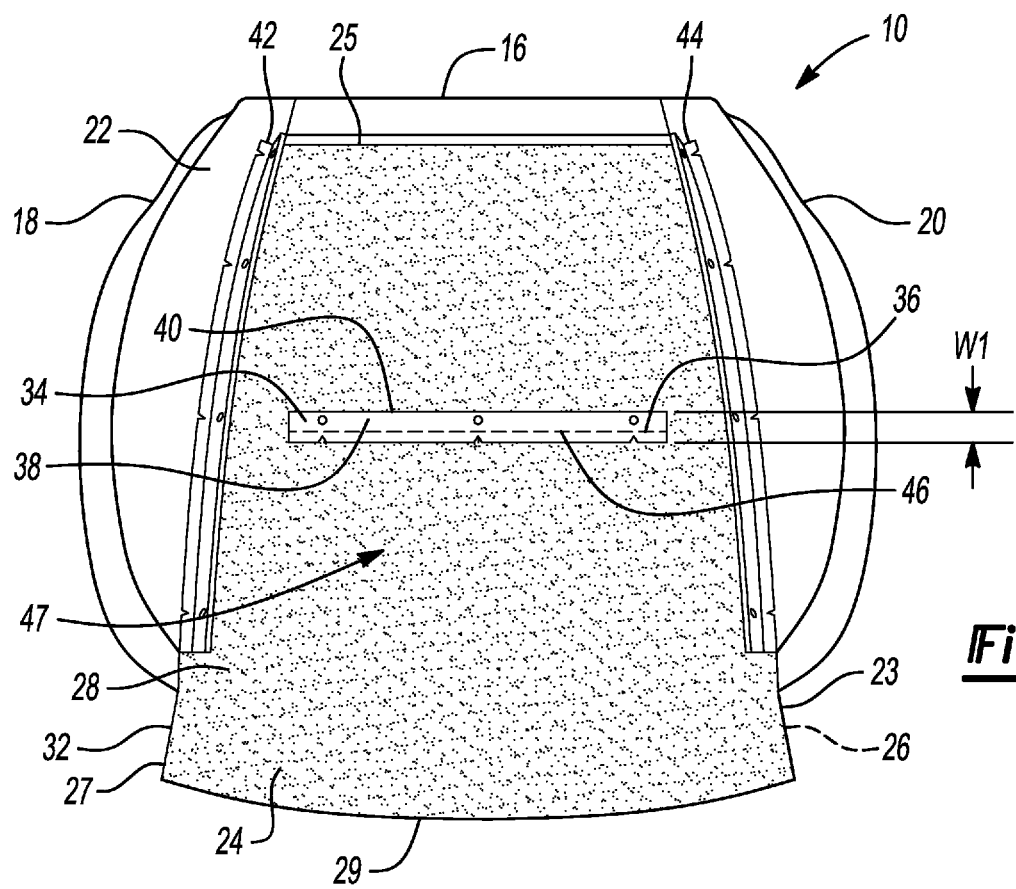
FIG. 3 shows a backside of the support material having several tie-downs attached thereto.

As shown in FIG. 3, an elongated member 34 is attached to the B-side 28 of the support material 24. In the embodiment shown in FIG. 3, the elongated member is attached to the support material 24 along a path 36. The path of 36 is a straight line—i.e., it is defined by a rectilinear line, but in other embodiments, an elongated member may itself include curved and straight portions and may be attached to a support material along a path that is defined by a curvilinear line, a rectilinear line, or both. In the embodiment shown in FIG. 3, the elongated member 34 is a tie-down that includes a non-woven fleece 38 having a width (W1) and a rigid plastic edge 40 attached along one of the longitudinal edges of the fleece 38. In at least one embodiment, the width (W1) of the fleece portion 38 of the tie-down may be approximately 20 millimeters (mm). As shown in FIG. 3, the seating system 10 includes two additional elongated members 42, 44 positioned along the left and right edges of the support material 24 where the center portion 16 of the cushion 22 meets the side bolsters 18, 20.

In the embodiment shown in FIG. 3, the elongated member 34 is attached to the B-side 28 of the support material 24 with a sewing seam 46. Although the sewing seam 46 shown in FIG. 3 includes a single row of stitching, other embodiments may include multiple rows of stitching, and as described above, may follow a path that includes straight lines, curved lines, or both. The elongated member 34 is attached to the B-side 28 of the support material 24 such that a channel 48 is created in the A-side 26 of the support material 24—this is shown in FIG. 2. The channel 48 corresponds to the path 36 followed by the sewing seam 46. In this embodiment, the channel 48 is created by the sewing seam 46 pulling the layer of foam 30 inward along the stitching. The channel 48 has a width (W2), and a depth—into the page as shown in FIG. 3—that may be defined, at least in part, by the width (W1) of the fleece 38 portion of the tie-down 34, as well as the size, shape, and number of rows of stitching that attaches the elongated member 34 to the support material 24.

Figure 4:
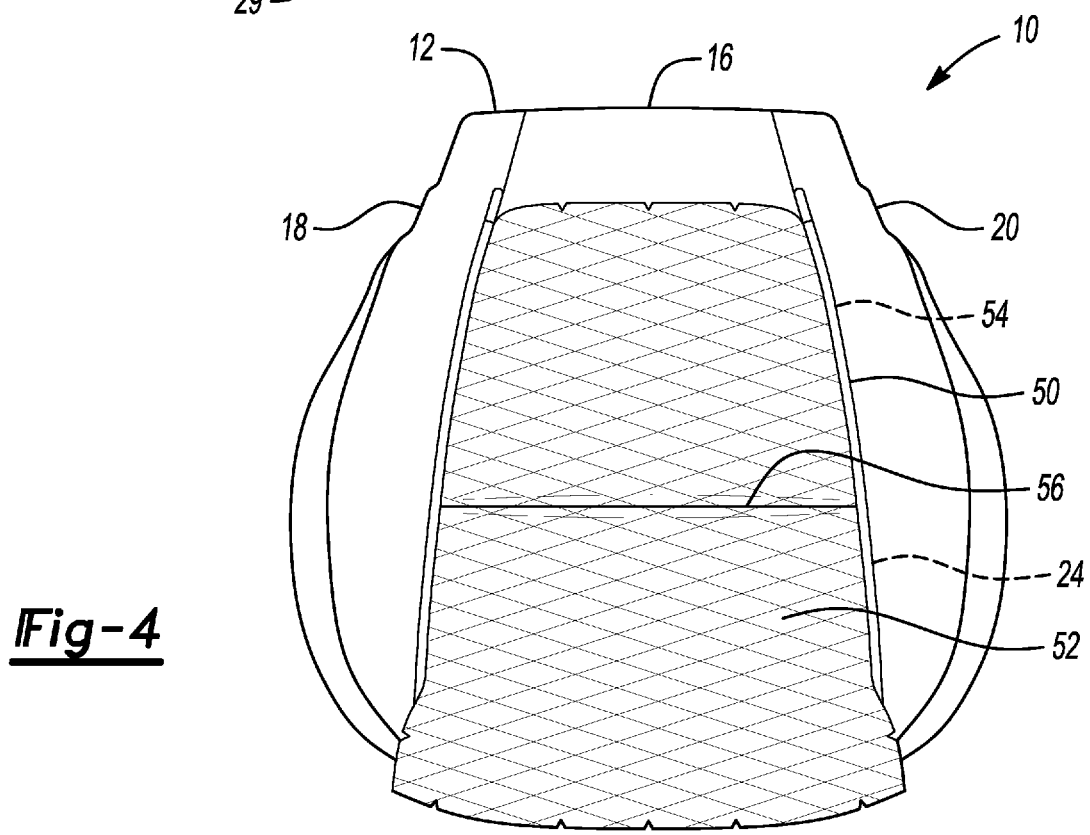
FIG. 4 shows a front side of the support material with a trim-cover material positioned over it.

In the embodiment shown in FIG. 3, the elongated member 34 is positioned in a central portion 47 of the support material 24, inboard from the perimeter 21 and each of the edges 23, 25, 27, 29. In contrast, the elongated members 42, 44 are positioned at the edges 27, 23, respectively. Similar to the channel 48 formed by the attachment of the elongated member 24 to the central portion 47 of the support member 24, the elongated members 42, 44 form channels in the A-side 26 of the support material 24 along the respective edges 27, 23. FIG. 4 shows the seating system 10, and in particular, the support material 24 covered by a trim cover, or trim material 50. The trim material 50 may be, for example, leather, vinyl, or a synthetic or natural fabric material. The trim material 50 has a first side or A-side 52 that faces outward away from the seat back 12 and a second side or B-side 54 that faces inward toward the seat back 12. The second side 54 is attached to the first side 26 of the support material 24. As shown in FIG. 4, the trim material 50 is attached to the support material 24 such that a portion of the trim material 50 is disposed in the channel 48 of the support material 24. This helps to ensure that the trim material 50 will not become baggy in the central portion 47, even if it is a large, single piece of material. Because there is a corresponding channel 55 in the foam cushion 22—see FIG. 1—a concavity 56 is created in the first side 52 of the trim material 24 along the location of the channel 48.

As shown in FIGS. 2 and 4, the channel 48 in the support material 24 may be conveniently referred to as a first channel and the concavity 56 in the trim material 50 may be conveniently referred to as a second channel. The second channel 56 corresponds to the first channel 48—e.g., the second channel 56 follows the path of the first channel 48, and has a width and depth at least partially defined by the first channel 48; it may also be at least partially defined by the channel 55 in the foam cushion 22. In the embodiment shown in FIG. 4, the channel 56 provides a visible indentation in the cover material 50 without the need to sew the trim material 50 or anchor it inside the channel 55 in the foam of the cushion 22. The trim material 50 may be attached to the support material 24, for example, with an adhesive bond. As described above, the support material 24 may be a layered material that includes a layer of adhesive webbing disposed over the layer of foam. Different types of adhesives may be used, including those that use a hot-bonding process and those that use a cold-bonding process.

In the embodiment shown in FIGS. 2-4, the seating system 10 includes three elongated members 34, 42, 44. The elongated members 42, 44 are positioned at the interface of the central portion 16 and the bolsters 18, 20, respectively, of the cushion 22. Therefore, they follow the natural lines of the cushion 22. Conversely, the elongated member 34, along with the channel 55 in the foam cushion 22, provides a channel 56 in the central portion 16 of the seat back 12 that would otherwise not be present. The elongated member 34 provides a more secure attachment between the central portion 47 of the support material 24 and the trim material 50 and helps to eliminate sagging or bagginess of the trim material 50 in this area. In some embodiments, there may not be a channel in a corresponding foam cushion, and the trim cover material may have a relatively thick foam backing. In such a case, the trim material may be attached to a channel in the support material, but no channel will show in the A-side of the trim material.

Figure 5:
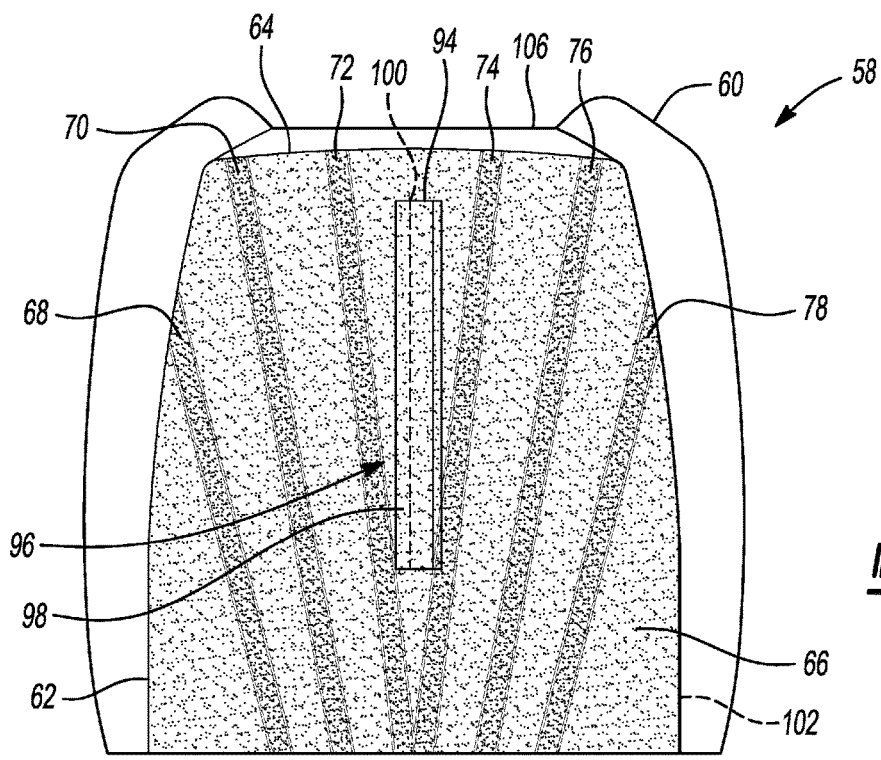
FIG. 5 shows the front side of a support material in accordance with embodiments described herein.
Figure 6:
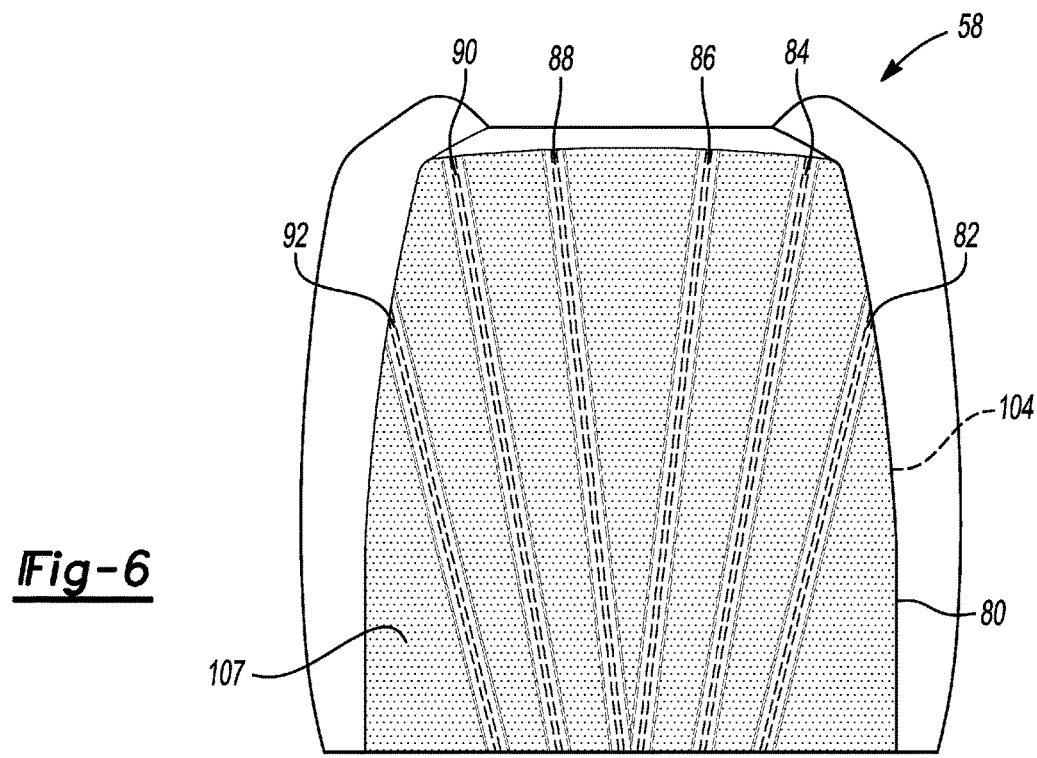
FIG. 6 shows the support material with a trim-cover material positioned over it.

This is shown in FIG. 5, which illustrates a seating system 58, which includes a seat back 60 having a support material 62 disposed over a central portion 64 of the seat back 60. In FIG. 5, a second side or B-side 66 of the support material 62 is shown facing outward for illustrative purposes. The B-side 66 of the support material 62 includes a plurality of channels 68, 70, 72, 74, 76, 78. In this embodiment, a trim material 80—see FIG. 6—includes a relatively thick and dense foam backing. For example, the foam backing may be approximately 5 mm thick and have a density of 28 kg/m³. The trim material 80 and its foam backing form a complex material into which channels can be formed—for example through a laser process known in the art. As shown in FIG. 6, the trim material 80 includes channels 82, 84, 86, 88, 90, 92, which correspond to the channels 68, 70, 72, 74, 76, 78 in the support material 62.

As shown in FIG. 5, an elongated member 94 is attached to the B-side 66 of the support material 62. It may be configured similarly to the elongated member 34, and as shown in FIG. 5, it is disposed in a central portion 96 of the support material 62. The elongated member 94 is attached to the support material 62 with a sewing seam 98 that forms a channel 100 in the A-side 102 of the support material 62, which is opposite the B-side 66. The B-side 104 of the trim material 80—see FIG. 6—is attached to A-side 102 of the support material 62, including the channel 100, for example, with adhesive. The attachment of the trim material 80 to the channel 100 formed in the A-side 102 of the support material 62 helps to keep the trim material 80 from sagging or being baggy in the central portion 64 of the seat back 60. Unlike the embodiment illustrated in FIG. 4, however, no channel is formed on the A-side 107 of the trim material 80. In this embodiment, there may be a channel in a foam cushion 106 of the seat back 60, and the elongated member 94 may be at least partially disposed within the channel. Although the elongated member 94 is shown as a tie-down in FIG. 5, it may be configured as part of a hook-and-loop fastener as described in conjunction with FIGS. 7 and 8.

Figure 7:
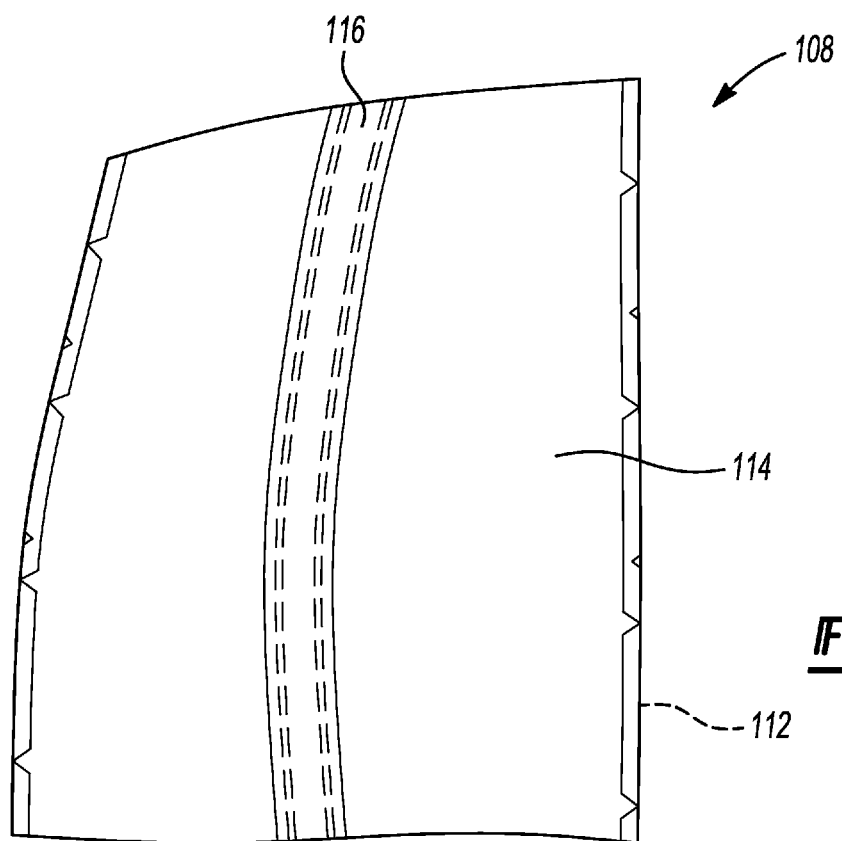
FIG. 7 shows the backside of a support material having a portion of a hook-and-loop fastener attached to it in accordance with embodiments described herein.

In FIG. 7, a seating system 108 includes a support material 110 having a first or A-side 112, which faces downward in FIG. 7, and a second or B-side 114, which faces upward in FIG. 7. An elongated member 116 is sewn to the B-side 114 of the support material 110, similar to the attachment of the elongated member 34 to the support material 24 shown in FIG. 3. Specifically, attaching the elongated member 116 to the B-side 114 of the support material 110 creates a channel 120 in the A-side 112 of the support material 110. As described above, an elongated member, such as the elongated member 34, may be configured as a "tie-down", which may have other uses in construction of a seating system, such as the seating system 10.

Figure 8:
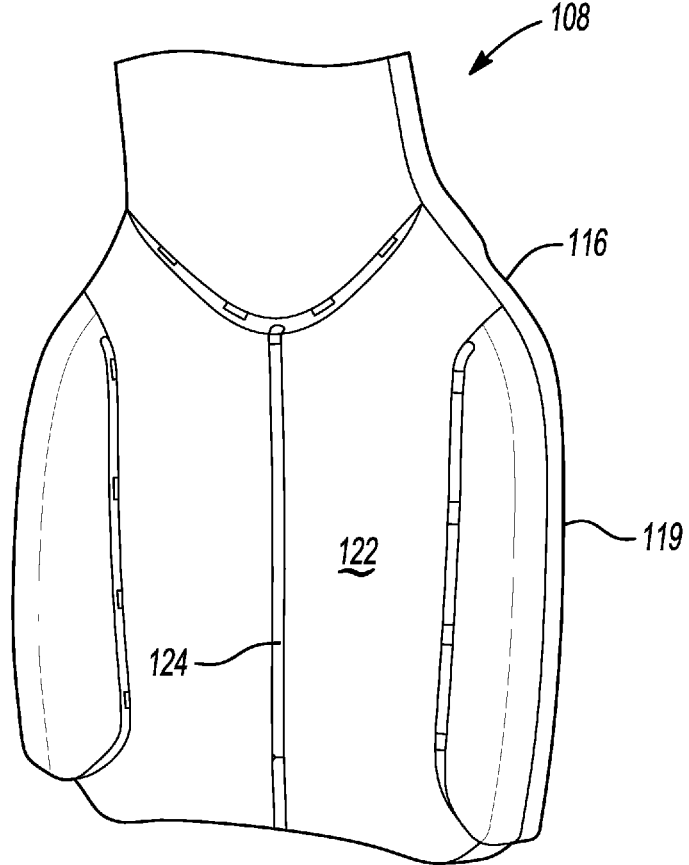
FIG. 8 shows a seat part, including a foam cushion, having another portion of the hook-and-loop fastener for attaching a support material.

In the embodiment shown in FIG. 7, however, the elongated member 116 is not configured as a tie-down, but rather as one portion 118 of a hook-and-loop fastener. In FIG. 8, the seating system 108 is shown in more detail. Specifically, the seating system 108 includes a seat back 116, which includes a foam cushion 119. The B-side 114 of the support material 110 is configured to be disposed on a surface 122 of the seat-back cushion 119. Another portion 124 of the hook and loop fastener is attached to the surface 122 of the cushion 119. It is positioned such that when the B-side 114 of the support material 110 is disposed on the surface 122, the two portions 118, 124 of the hook-and-loop fastener are connected. This may help keep the support material 110 from being baggy in the center of the foam cushion 119, which is generally concave and may not otherwise provide a snug fit with the support material 110.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seating system for a vehicle, comprising:
   a seat part including a cushion;
   a support material having a first side and a second side, the second side of the support material being disposed on a surface of the cushion;
   an elongated member attached to the second side of the support material along a path creating a channel in the first side of the support material along the path; and
   a trim material including a single piece of material having a first side facing outward away from the seat part and a second side facing inward toward the seat part, the second side of the single piece of material of the trim material being attached to the first side of the support material such that a portion of the single piece of material of the trim material is disposed in the channel.

2. The seating system of claim 1, wherein the support material defines a perimeter having a plurality of edges, and the elongated member is attached to the support material inboard from each of the edges.

3. The seating system of claim 1, wherein the elongated member includes a non-woven material, and the elongated member is attached to the second side of the support material with a sewing seam.

4. The seating system of claim 1, wherein the path is defined by at least one of a rectilinear line or a curvilinear line.

5. The seating system of claim 1, further comprising a plurality of the elongated members attached to the second side of the support material, each of the elongated members being attached to the second side of the support material along a respective path, and each of the elongated members creating a respective channel in the first side of the support material along the respective path.

6. The seating system of claim 1, wherein the elongated member includes one portion of a hook-and-loop fastener attached to the second side of the support material with a sewing seam.

7. The seating system of claim 6, further comprising one other portion of the hook-and-loop fastener attached to the surface of the cushion and positioned such that when the second side of the support material is disposed on the surface of the cushion, the two portions of the hook-and-loop fastener are connected.

8. A seating system for a vehicle, comprising:
   a seat part including a cushion;
   a support material having a first side and a second side, the second side of the support material being disposed on a surface of the cushion;
   an elongated member attached to the second side of the support material along a path such that a first channel corresponding to the path is created in the first side of the support material; and
   a trim material including a single piece of material having a first side facing outward away from the seat part and a second side facing inward toward the seat part, the second side of the single piece of material of the trim material being attached to the first side of the support material along the first channel.

9. The seating system of claim 8, wherein the support material includes a central portion bounded by a plurality of edges, and the elongated member is attached to the support material inboard from each of the edges.

10. The seating system of claim 8, wherein the elongated member includes one portion of a hook-and-loop fastener attached to the second side of the support material with a sewing seam.

11. The seating system of claim 8, wherein the support material includes a layer of non-foam material attached to a layer of foam material, and the layer of non-foam material includes the second side of the support material.

12. The seating system of claim 8, wherein the path is defined by at least one of a rectilinear line or a curvilinear line.

13. The seating system of claim 12, further comprising a plurality of the elongated members attached to the second side of the support material, each along a respective path, and each creating a respective channel in the first side of the support material along the respective path.

14. A seating system for a vehicle, comprising:
   a seat part including a cushion;
   a support material including a single piece of layered material having a first side and a second side, the second side of the single piece of layered material of the support material being disposed on a surface of the cushion;

an elongated member attached to the second side of the single piece of layered material of the support material along a path creating a channel in the first side of the single piece of layered material of the support material along the path; and a trim material having a first side facing outward away from the seat part and a second side facing inward toward the seat part, the second side of the trim material being attached to the first side of the single piece of layered material of the support material such that a portion of the trim material is disposed in the channel.

15. The seating system of claim 14, wherein the single piece of layered material of the support material defines a perimeter having a plurality of edges, and the elongated member is attached to the single piece of layered material of the support material inboard from each of the edges.

16. The seating system of claim 14, wherein the elongated member includes a non-woven material, and the elongated member is attached to the second side of the single piece of layered material of the support material with a sewing seam.

17. The seating system of claim 14, wherein the path is defined by at least one of a rectilinear line or a curvilinear line.

18. The seating system of claim 14, further comprising a plurality of the elongated members attached to the second side of the single piece of layered material of the support material, each of the elongated members being attached to the second side of the single piece of layered material of the support material along a respective path, and each of the elongated members creating a respective channel in the first side of the single piece of layered material of the support material along the respective path.

19. The seating system of claim 14, wherein the trim material includes a single piece of material, and the second side of the trim material is attached to the first side of the single piece of layered material of the support material such that a portion of the single piece of material of the trim material is disposed in the channel.

\* \* \* \* \*